US009255398B2

(12) United States Patent
Griem (10) Patent No.: US 9,255,398 B2
(45) Date of Patent: Feb. 9, 2016

(54) FIRE PROOF ORIENTED STRAND BOARD AND ITS MANUFACTURE

(76) Inventor: John Griem, Hellerup (DK)

(*) Notice: Subject to any disclaimer, the term of this patent is extended or adjusted under 35 U.S.C. 154(b) by 275 days.

(21) Appl. No.: 14/008,479

(22) PCT Filed: Apr. 20, 2012

(86) PCT No.: PCT/IB2012/052005
§ 371 (c)(1),
(2), (4) Date: Dec. 30, 2013

(87) PCT Pub. No.: WO2012/143907
PCT Pub. Date: Oct. 26, 2012

(65) Prior Publication Data
US 2014/0102615 A1    Apr. 17, 2014

(51) Int. Cl.
*B27K 3/16* (2006.01)
*B27K 3/52* (2006.01)
(Continued)

(52) U.S. Cl.
CPC ............... *E04B 1/942* (2013.01); *B27K 3/0207* (2013.01); *B27K 3/0214* (2013.01); *B27K 3/166* (2013.01); *B27K 3/52* (2013.01); *B27M 1/02* (2013.01); *B27N 3/02* (2013.01); *B27N 3/14* (2013.01);
(Continued)

(58) Field of Classification Search
CPC .. B27K 3/0207; B27K 3/0214; B27K 3/0221; B27K 3/025; B27K 3/04; B27K 3/166; B27K 3/32; B27K 3/52; B27K 2200/10; B27K 2240/30; B27N 3/02; B27N 3/04; B27N 3/14; B27N 3/143; B27N 9/00; C09K 21/00; C09K 21/02; C09K 21/04; C09K 21/06
See application file for complete search history.

(56) References Cited

U.S. PATENT DOCUMENTS

| 8,980,145 B2* | 3/2015 | Baroux ............ B27N 9/00 264/115 |
| 2004/0028934 A1 | 2/2004 | Preston et al. |
| 2006/0113513 A1 | 6/2006 | Nilsson |

FOREIGN PATENT DOCUMENTS

| DE | 10 2005 059900 | 6/2007 |
| WO | WO 97/46635 | 12/1997 |

(Continued)

OTHER PUBLICATIONS

International Search Report for PCT/IB2012/052005 dated Jul. 4, 2012.

(Continued)

*Primary Examiner* — Michael Tolin
(74) *Attorney, Agent, or Firm* — Marvin Petry Stites & Harbison PLLC (57) ABSTRACT

The invention pertains to a method of manufacturing a fire proof board from strands of wood, the method comprising the following steps in the given order: (a) providing strands of wood having a humidity between 5% and 25%, preferably between 5% and 20%, even more preferably between 8% and 20%, (b) immersing the strands of wood in a watery solution of a flame retardant chemical composition, (c) separating the strands of wood from each other, (d) at least in part drying the strands of wood thereby providing dry impregnated strands of wood, (e) applying an adhesive to the strands of wood, and (f) forming a board of a predetermined shape from the strands. The invention furthermore pertains to a board formed by a plurality of strands of wood that are compressed and bonded together with an adhesive, wherein the board further comprises a flame retardant chemical composition, said composition comprising a phosphate compound.

24 Claims, 2 Drawing Sheets

(51) Int. Cl.
*B27N 3/14* (2006.01)
*C09K 21/04* (2006.01)
*C09K 21/06* (2006.01)
*B27N 9/00* (2006.01)
*E04B 1/94* (2006.01)
*B27K 3/02* (2006.01)
*B27N 3/02* (2006.01)
*B27M 1/02* (2006.01)

(52) U.S. Cl.
CPC *B27N 3/143* (2013.01); *B27N 9/00* (2013.01); *C09K 21/04* (2013.01); *C09K 21/06* (2013.01); *B27K 2200/10* (2013.01); *B27K 2240/30* (2013.01)

(56) References Cited

FOREIGN PATENT DOCUMENTS

| WO | WO 01/53621 | 7/2001 |
| WO | WO 03/009533 | 12/2003 |
| WO | WO 2006/072672 | 7/2006 |

OTHER PUBLICATIONS

Written Opinion of the International Searching Authority for PCT/IB2012/052005 dated Jul. 4, 2012.
International Preliminary Report on Patentability for PCT/IB2012/052005 dated Aug. 19, 2013.

* cited by examiner

FIRE PROOF ORIENTED STRAND BOARD AND ITS MANUFACTURE

TECHNICAL FIELD

The present invention pertains to a method of manufacturing a fire proof board from strands of wood, and to a fire proof board formed by strands of wood.

BACKGROUND OF THE INVENTION

Oriented strand board, also known as OSB, waferboard, Sterling board or Exterior board and SmartPly is a widely used engineered wood product formed by strands (flakes) of wood, often layered in specific orientations. In appearance, it may have a rough and variegated surface with the individual strands (typically around 2.5 cm by 15 cm each) lying unevenly across each other. OSB's are cheap and strong boards, and this makes them excellent building material.

Most countries have certain fire prevention regulations setting certain standards for the fire retardancy of building materials for indoor use, especially for use in public buildings. However, it is a problem with flame retardant agents used in the industry today that they are toxic to humans and animals. Building material treated with these known toxic flame retardant agents will inevitably release some of it into the surrounding environment, which makes building materials that are treated with such toxic agents unsuitable for indoor use.

In WO 03/099633 is disclosed a method of providing flame retardant OSB plates. According to the disclosed method, wood pieces are impregnated with a flame retardant composition before they are processed into strands. The impregnation with the flame retardant is done by the application of a so called vacuum-pressure process, wherein the wood first is subjected to a vacuum; subsequently the flame retardant composition is added and subjected to pressure in order to impregnate the wood pieces. These impregnated wood pieces are than processed into strands that are subsequently used to produce OSB plates in a traditional way.

In WO 01/53621 is disclosed another method of producing flame retardant OSB plates. According to the disclosed method, the strands are led through a sprinkling device, wherein they are sprayed with a watery solution of a flame retardant mineral composition comprising ammonium sulfate and/or ammonium phosphate. Next to the sprinkling device an air heater is placed. The strands are then carried with this hot air through a dryer. From these impregnated strands fire retardant OSB plate are produced.

In WO 97/46635 is disclosed a fire retardant composition for use in OSB plates, said composition comprising a mixture of Ammonium sulfate, Borax and trinatrium phosphate. Furthermore is disclosed an OSB plate comprising such a fire retardant composition, and a method of providing a fire retardant OSB plate. The method involves the steps of impregnating the strands with the above mentioned mixture in a watery solution, and subsequently drying them to a humidity of between 1% to 12%. After this drying, the strands are coated with an adhesive and formed into plates.

In US 2004/0028934 is disclosed a method of fire proofing OSB plates by applying a fire retardant composition to green strands, i.e. strands which have not been pre-dried. The strands are sprayed with the fire retardant composition, or dipped into it. To facilitate an accurate application of the fire retardant, the logs used for the production of strands are weighed before being supplied to a flaker. From this weighing in combination with other parameters, the moisture content of the wood can be estimated.

In WO 03/099533 is disclosed yet another method of providing fire proof OSB plates, according to which microchips are produced from raw wood and impregnated with a flame proofing agent, and shredded into smaller strands after impregnation.

In US 2006/0113513 is disclosed a fire retardant composition and method of its production. The composition comprising water, a highly concentrated alkali, at least one of or a combination thereof, of anhydrous citric acid, citric acid, acetic acid or a related salt thereto. The composition also includes phosphate as well as an alkali metal salt or compound from at least one of lithium, sodium and/or potassium cation in combination with at least one of an acetate, bicarbonate, carbonate and/or hydroxide anion. The composition is then adjusted to a pH value around 6.6% to 7.5% by adjusting the amounts of highly concentrated alkali and/or the citric acid/acetic acid respectively. The compaction is allegedly able to absorb large quantities of heat energy, and is therefore especially suitable as a surface treatment of various objects.

However, in order to produce fire retardant OSB plates in large scale production facilities in an error free and effective manner, it is for example desirable to perform the impregnation of the strands at a pace that will not interfere with, or halt, the running of the rest of the process steps associated with the large scale production of OSB plates. In order to achieve this, it is may be desirable to impregnate the strands with a fire retardant composition at a very high rate and to a sufficient degree—but not to a too large degree, because the impregnation and other processing steps may negatively affect the structure of the strands in such a way that OSB plates produced from them are too weak. Furthermore, some of the fire retardant chemical composition may seep out of the strands and cover its surface, so that the subsequently applied adhesive will not bind the strands property together, which again leads to a useless and weak OSB plate.

SUMMARY OF THE INVENTION

It is thus an object of the present invention to provide an improved method of manufacturing fire proof boards formed by strands of wood, which may be applied in large scale production of said boards.

It is a further objective of the present invention to provide a fireproof board formed by strands of wood, which is suitable for indoor use as a building material.

According to the present invention, the above-mentioned and other objects are fulfilled by a method of manufacturing a fire proof board from strands of wood, the method comprising the following steps in the given order:

(a) providing strands of wood having a humidity between 5% and 25%, preferably between 5% and 20%, even more preferably between 8% and 20%, (b) immersing the strands of wood in a watery solution of a flame retardant chemical composition, (c) separating the strands of wood from each other, (d) at least in part drying the strands of wood, thereby providing dry impregnated strands of wood, (e) applying an adhesive to the strands of wood, and (f) forming a board of a predetermined shape from the strands.

By immersing the strands in a watery solution of a flame retardant chemical composition, virtually each individual strand of wood in the board is made flame retardant. However, in order to achieve an efficient and timesaving impregnation of the strands with the flame retardant chemical composition, the strands are separated from each other in process step (c). Investigations have shown that the impregnation time can be reduced from approximately 12 hours to some few minutes if this separation of the strands is properly achieved. The method steps (b)-(d) can be implemented in already existing machinery far the production of for example oriented strand boards, wherein method steps (a), (e) and (f) may be exercised in a manner known in the art of producing boards of strands of wood. For example typically in step (a), the strands are cut from a log of wood. When immersed in the watery solution of the flame retardant chemical composition, the strands thus absorb this watery solution until they are saturated. In the step (d), the strands are at least in part dried, whereby the water is at least in part removed from said strands, but the fire retardant chemical composition remains within the strands. Hereby the strands are impregnated by the fire retardant chemical composition before the adhesive is applied to the strands and they are formed into a board of a predetermined shape. In step (a) it has been specified that the strands of wood have a humidity between 5% and 25%, preferably between 5% and 20%, even more preferably between 8% and 20%. Hereby a better impregnation of the wood by the flame retardant chemical composition is achieved, because in dryer wood the pores of the wood are closed, whereas wood having a humidity higher than 25% is not able to absorb much of said flame retardant chemical composition.

Investigations have shown that for most commonly used wood species (e.g. aspen or poplar) the impregnation is most efficient if the strands are provided with a humidity between 12% and 17%, which hence is the most preferred range of humidity of the strands are used in the present method.

Advantageously, the step (a) of separating the strands from each other is performed substantially simultaneously to the step (b) of immersing the strands in a watery solution of a flame retardant chemical composition, i.e. the strands are advantageously separated from each other in the watery solution of a flame retardant chemical composition. Hereby is achieved that virtually all the surface of each individual strand is exposed to the watery solution of a flame retardant chemical composition, thereby increasing the efficiency of the impregnation of the strands.

In an embodiment, the step (c) of separating the strands from each other may comprise stirring the mixture of strands and watery solution of a flame retardant chemical composition. This may for example be done by mechanical stirring means know in the art. Investigations have however surprisingly shown that it increases the impregnation efficiency (e.g. reduces the time needed to impregnate the strands) if this stirring is achieved by sending air bobbles through the watery solution of a flame retardant chemical composition.

In a preferred embodiment, the method further comprises a step of measuring whether the provided strands of wood have the desired humidity between 5% and 25%, preferably between 5% and 20%, even more preferably between 8% and 20%, or even more preferably between 12% and 17%, prior to the step (b).

Preferably, the method further comprises the step of increasing the humidity of the strands if the measurement shows that they have a humidity which is lower than the desired one, or pre-drying the strands if the measurement shows that they have a humidity that is larger than the desired one. Hereby it is achieved that the strands have the optimal humidity when they are immersed in the watery solution of a flame retardant chemical composition, i.e. that they have a humidity which facilitates the most efficient (quickly) impregnation of the strands. This is of critical importance because, if it is not possible to impregnate the strands quickly enough, then the impregnation of the strands will negatively affect the other further processing steps used in manufacturing OSB plates. The process is naturally not limited to one feed line of strands, but could include one or more additional feed lines.

When the strands are removed from the watery solution of a flame retardant chemical composition, they are so wet that the adhesives, which are usually used in the manufacturing of OSB plates, will not bond to them. Therefore, the step (d) of drying the strands of wood comprises the step of drying the strands of wood to a humidity of between 4% and 10%, preferably between 4% and 8%, such as for example about 6%.

Preferably, the step (d) of drying the strands of wood comprises the step of drying the strands of wood in such a way so that substantially none, or negligibly little, of the fire retardant chemical composition seeps out of the strands and deposits on the surface of said strands.

In a preferred embodiment, the step (d) of drying the strands of wood comprises the step of drying the strands for 2 minutes-10 minutes, preferably for 2 minutes-8 minutes, even more preferably for 2 minutes-6 minutes, yet even more preferably for 3 minutes-4 minutes. Investigations have shown that if the strands are dried too fast, or at a too high temperature, then parts of the chemical composition seeps out of the strands again and deposits on the surface of them. If this happens, the adhesives applied in OSB manufacturing will not be able to bond properly to the strands, why it is impossible to use the strands in the production of OSB plates. Investigations have shown that if the strands are dried for the periods mentioned above, then it is possible to preclude the problems associated with seeping out of parts of the fire retardant chemical composition, and it is possible to produce OSB plates from them which do not fail standardized stress tests. However, in order to implement the step (d) in large scale production of OSB plates, the slowness of the drying must be balanced against the desired speed of the overall process, which is reflected in the preferred intervals mentioned above.

In a preferred embodiment, the watery solution of the fire retardant chemical composition comprises an unsaturated solution of the fire retardant chemical composition. Hereby the problems associated with impregnating too much of the fire retardant chemical composition are avoided. These problems are for example that the structure of the wooden strands may be weakened or at least in part destroyed, thereby weakening the strands. This causes the OSB plates produced from such strands to be too weak.

Preferably, the watery solution of the fire retardant chemical composition comprises less than 25% by weight of said solution, preferably between 15% and 22% by weight of said solution, such as 18.5% by weight of said solution. Tests performed by the applicant have surprisingly shown that optimal results are achieved if between 15% and 22% by weight of a fire retardant chemical composition is used.

In an embodiment, the step (b) of immersing the strands of wood in a watery solution of a flame retardant chemical composition comprises the sub step of immersing the strands of wood in a watery solution of a flame retardant chemical composition for less than 10 minutes on average, preferably between 2 minutes and 6 minutes, even more preferably between 3 minutes and 4 minutes on average. Tests performed by the applicant have surprisingly shown that if the strands are separated, e.g. by stirring, then the strands will be sufficiently impregnated with the fire retardant chemical composition if they are immersed in said watery solution for less than 10 minutes on average, preferably between 2 minutes and 6 minutes, even more preferably between 3 minutes and 4 minutes on average. Hereby it will be possible to balance the need for keeping up with the general production speed of an OSB plate manufacturing plant and sufficient impregnation of the strands with the fire retardant chemical composition.

In a preferred embodiment, resin adhesives are used alone or in combination with wax. For example 95% by weight of strands of wood and 5% by weight of wax and resin.

In a preferred embodiment the step (f) of the inventive method further comprises the sub steps of:
- aligning the strands so that they are substantially parallel to each other,
- compressing the aligned strands and adhesive with pressure into a predetermined shape, and
- curing said compressed mixture of strands and adhesive to produce a board of strands having a predetermined shape.

Alternatively, the step (f) further comprises the sub steps of
- forming at least two layers of strands, wherein the strands of each layer are substantially parallel to each other,
- placing the layers an top of each other in such a way that the strands of two abutting layers are not parallel to each other,
- compressing the layers of strands and adhesive with pressure into a predetermined shape, and
- curing said compressed mixture of strands and adhesive to produce a layered board of strands having a predetermined shape.

The layers may be created by shredding wood into strands, which are sifted and then oriented on a belt or wire cauls. Then a mat is made in a forming line, where the layers are built up with the external layers aligned in the strength axis of the board with internal layers cross-oriented. The number of layers placed is determined partly by the thickness of the panel, but is limited by the equipment installed at the manufacturing site. However, individual layers can also vary in thickness to give different finished panel thicknesses (typically, a 15 cm layer will produce a 15 mm board thickness).

In a further embodiment according to the invention, the step (f) further comprises the sub steps of
- mixing the dry impregnated strands with non-impregnated strands,
- aligning said mixture of impregnated and non-impregnated strands so that they are
- aligning said mixture of impregnated and non-impregnated strands so that they are substantially parallel to each other,
- compressing the aligned strands and adhesive with pressure into a predetermined shape, and
- curing said compressed mixture of strands and adhesive to produce a board of strands having a predetermined shape.

Hereby is achieved an embodiment, wherein it is possible to manufacture a fire proof OSB plate wherein the flammability can be balanced to match specific regulatory requirements and at the same time preclude excessive use of the flame retardant chemical composition.

In a further embodiment according to the invention, the step (f) further comprises the sub steps of
- forming at least three layers of strands, wherein the strands of each layer are substantially parallel to each other,
- placing the layers on top of each other in such a way that the strands of two abutting layers are not parallel to each other,
- forming the two outer layers, i.e. the top and bottom layer from impregnated strands, and forming the middle layer of non-impregnated strands,
- compressing the layers of strands and adhesive with pressure into a predetermined shape, and
- curing said compressed mixture of strands and adhesive to produce a layered board of strands having a predetermined shape.

Hereby is achieved an OSB plate, wherein only the outer layer on each site is treated with a flame retardant chemical composition. This way huge savings of the flame retardant chemical composition may be achieved. In certain circumstances such a fire protection would be sufficient.

In yet another alternative embodiment, the step (f) further comprises the sub steps of
- compressing the strands and adhesive with pressure into a predetermined shape, and
- curing said compressed mixture of strands and adhesive to produce a board of strands having a predetermined shape.

Hereby a simple way of producing the boards is achieved, wherein no aligning is required.

In a further embodiment according to the invention, the step (f) further comprises the sub steps of
- mixing the impregnated strands of wood with non-impregnated strands of wood,
- compressing the mix of impregnated and non-impregnated strands and adhesive with pressure into a predetermined shape, and
- curing said compressed mixture of strands and adhesive to produce a board of strands having a predetermined shape.

Hereby, a simple way of producing boards is achieved, where savings on the usage of the flame retardant chemical composition are furthermore facilitated, because a mix of impregnated and non-impregnated strands is used.

In a preferred embodiment, 60 to 70 percent of the strands are 5 to 20 cm long, while the remaining 30 to 40 percent of the strands are normally smaller than 5 cm and act as fillers when compressed to form the board.

The mat is placed in a thermal press to compress the strands and bond them by heat activation and curing of the resin that has been coated on the strands. Individual boards may then be cut from the mats into finished sizes In one embodiment, the adhesive is a sulfonated phenol-formaldehyde resin with a curing catalyst. However, in a preferred embodiment the adhesive is polymeric diphenyl-methane disocyanate. In one embodiment, the compressing of the strands and adhesive with pressure into a predetermined shape is performed at a pressure of about 4200 kPa, and cured at a temperature of 160 degrees Celsius.

In a preferred embodiment, the step (d) of drying the strands of wood comprises the step of subjecting the strands of wood to an air jet, which has a direction that is substantially opposite to the force of gravity on the strands. Hereby the air-jet will remove the moisture and water content from the strands, whereby the strands become increasingly lighter. The pressure from the air-jet could be balanced in such a way against the force of gravity on the strands that when the water content of the strands is sufficiently low, the strands are moved further up in a pipe or tunnel until they reach a level wherein the water content is sufficiently low for them to be moved further to the stage, wherein the adhesive is applied to it. The process could in these stages be entirely airborne.

In a further alternative embodiment of the invention, the step (d) of drying the strands of wood comprises the step of drip-drying the strands of wood.

In one embodiment, the step (a) of applying an adhesive to the strands of wood comprises the sub step of spraying the adhesive on the strands of wood and/or placing the strands of wood in the adhesive.

In a preferred embodiment, the flame retardant chemical composition comprises a phosphate compound or a phosphorous material. The phosphate could for example be ammonium phosphate (CAS no. 10124-31-9), although other types of phosphates, such as potassium or sodium phosphate, can be used. Thus, it is contemplated that any type of phosphate compound can be used. A preferred embodiment of the invention includes ammonium phosphate dibasic (CAS no. 7783-28-0). However, it is contemplated that other forms of ammonium phosphate can be used, such as monobasic ammonium phosphate (CAS no. 7-722-76-1), ammonium polyphosphate, or some other type of ammonium phosphate compound, such as ammonium pyrophosphate. The chemical structure of ammonium phosphate dibasic makes it an especially suitable ingredient for some embodiments of the invention.

In a preferred embodiment, the flame retardant chemical composition comprises a pH regulating compound. Although the pH can vary throughout a wide range, the pH of the composition is preferably maintained within the pH range of about 4 to 9, more preferably about 4 to 6.5. In a preferred embodiment the pH is about 5.5.

Preferably, the pH regulating compound is a weak organic acid. By a weak acid is meant an acid that dissociates incompletely, i.e. it does not release all of its hydrogens in a solution, donating only a partial amount of its protons to the solution. These acids have higher pKa than strong acids, which releases all of their hydrogen atoms when dissolved in water. By an organic acid is meant an organic compound with acidic properties. For example the organic acids may be the carboxylic acids, whose acidity is associated with their carboxyl group —COOH or for example sulfonic acids, containing the group —$SO_2OH$, which are relatively stronger acids. Generally the relative stability of the conjugate base of the acid determines its acidity. Other groups can also confer acidity, usually weakly: —OH, —SH, the enol group, and the phenol group. For example any of the following acids could be used: Lactic acid, Acetic acid, Formic acid, Citric acid, Oxalic acid, Uric acid.

The pH can also be adjusted through the use of appropriate phosphate salts, or by addition of small amounts of strong acids, such as HCl, or strong bases, such as NaOH. Citric acid may be an especially suitable material, as it is a relatively gentle acid that may appeal to the buying public, government regulators, or any other persons who have reason to review the ingredients of the invention. The amount of acidic material will depend on the type of the acidic material used and can vary throughout a wide range.

In some embodiments of the invention, a preservative material is added to prevent growth of bacteria or mold during transport and/or storage of the composition. Any suitable preservative can be used to serve this purpose. Preferably, the preservative material provides a source of benzoate ion. In some embodiments, the source of benzoate ion is a benzoic acid, and sodium benzoate is the preferred choice. Natriumbenzoate may be especially suitable, as it is a naturally occurring preservative that may appeal to the buying public, government regulators, or any other persons who have reason to review the ingredients of the invention. In an alternative embodiment, Bronopol (CAS no. 52-51-7) can be used as the preservative material.

Preferably, the preservative material is added in sufficient amount to inhibit the growth of bacteria and mold in the composition for a desired period of time. In embodiments in which sodium benzoate is used, the amount can vary throughout a wide range. It is contemplated that the ranges may shift depending on the type of preservative material used. Advantageously, sodium benzoate in a range between about 0.9% and 2% eliminates all bacteria and mold for at least one year for a composition that is kept at room temperature and in a closed container.

Furthermore, the source of benzoate ion works as an accelerator for the fire retardant composition, partly because it effectively alters the surface tension of the watery solution of the fire retardant chemical composition in such a way that it is able to spread evenly on and throughout the material (in this case strands of wood) to which it is applied.

In a preferred embodiment, the phosphate compound forms between 6% and 30% by weight of the flame retardant chemical composition. Although a wide range of concentration of ammonium phosphate can be included, ammonium phosphate dibasic preferably makes up about 2% to about 30% of the composition when an aqueous solvent is also present in the composition. More preferably, dibasic ammonium phosphate makes up about 9% to about 23% of the composition, and most preferably, it makes up about 14% to 18% of the composition. It is contemplated that these ranges may shift depending on the type of phosphate containing material that is used.

In one embodiment, the pH regulating compound forms between 0.25% and 10% by weight of the flame retardant chemical composition. Preferably, citric acid is used as the pH regulating compound, and it preferably makes up about 0.25% to about 10% or 0.25% to 4% by weight of the composition when an aqueous solvent is also present in the composition. More preferably, the citric acid makes up about 0.75% to about 2% by weight of the composition, and most preferably, it makes up about 0.9% to 1.1% by weight of the composition. It is contemplated that these ranges may shift depending on the type of acidic material used.

In another embodiment the preservative compound forms between 0.25% and 15% by weight of the flame retardant chemical composition. In embodiments in which sodium benzoate is used as the preservative compound, the amount can vary throughout a wide range, but preferably the sodium benzoate makes up about 0.25% to about 15% or 0.25% to about 7% by weight of the composition when an aqueous solvent is also present in the composition. More preferably, sodium benzoate makes up about 0.75% to about 4% by weight of the composition, and most preferably, it makes up about 0.9% to 2% by weight of the composition. It is contemplated that these ranges may shift depending on the type of preservative material that is used. Advantageously, sodium benzoate in a range between about 0.9% and 2% by weight eliminates all bacteria and mold for at least one year for a composition that is kept at room temperature and in a closed container.

In one preferred embodiment the flame retardant chemical compound comprises in a mixture: ammonium phosphate, a source of citrate ion, a source of benzoate ion, wherein there is 1 part by weight of the source of citrate ion, 12.7 to 20 parts by weight of ammonium phosphate, and 0.8 to 2.2 parts by weight of the source of benzoate ion.

Tests have shown that the composition is especially effective when the ingredients are combined within these ranges of ratios.

The ingredients of the flame retardant composition can be combined in any suitable way to make the composition. An example of one manner by which the ingredients can be combined for a composition that includes an aqueous solvent will now be discussed. Approximately 50% of the aqueous solvent can be poured in to a pan or other container of appropriate size. Ammonium phosphate dibasic can be added while stirring rapidly, and stirring can continue for about 10-15 minutes until the ammonium phosphate dibasic is completely dissolved. Citric acid can then be added while continuing to stir rapidly for about 5 minutes. Sodium benzoate can then be added while continuing to stir rapidly for about another 5 minutes until the liquid is clear. The remaining 50% of aqueous solvent can then be added while continuing to stir the solution for approximately 5 additional minutes. Ideally, the composition will be clear, and the ingredients will be completely dissolved without any visible traces of solid material. This is only one example as to how the ingredients can be combined, and it will be apparent to a person skilled in the art that there exist numerous other mixing methods that can be used.

An example of one manner by which the ingredients can be combined for a composition that, at least initially, does not include an aqueous solvent will now be discussed. Ammonium phosphate dibasic can be poured into any type of conventional powder mixer and mixed until all lumps are dissolved. Citric acid can then be added and mixed in the powder mixer until all lumps are dissolved and the ingredients are thoroughly mixed together. The sodium benzoate dibasic can be added next and mixed in the powder mixer until all lumps are dissolved and all of the ingredients are thoroughly mixed together. The composition may now be sold or stored in this granular or powder form. At any desired time, the granular or powder mixture can be dissolved in an aqueous solvent. The solution can be mixed until the granular powder mixture is dissolved, contains no lumps or visible traces of solid material, and the solution is clear.

The composition can be used in various types of conditions, but some conditions can make the composition especially effective. For example, applying the composition to dry materials in temperatures at 10 degrees Celsius or above has proven to be effective. However, the composition is effective when applied under alternative conditions. In one embodiment, the composition can be applied by spraying it onto a dry material or submerging a dry material into the composition. Preferably, the material is allowed to dry after being saturated with the composition. This only provides one example of how the composition can be used and should not be interpreted as a limitation to the invention.

An object of the invention is furthermore achieved by a board formed by a plurality of strands of wood that are compressed and bonded together with an adhesive, wherein a major part of the strands is impregnated with a flame retardant chemical composition, said chemical composition comprising a phosphate compound and a weak organic acid as a pH regulating compound. In one embodiment of the board, the phosphate compound is an ammonium phosphate.

Hereby is achieved a flame retardant board which does not have the detrimental environmental health-related side effects as boards treated with the flame retardant compositions known in the art. Since phosphate is generally non-hazardous to the health and life of humans and other mammals, possible emissions of residue phosphate into the surrounding environment of the board do generally not lead to any impairment of the health or life of mammals. Thus, a fireproof board is provided that may be suitable for indoor use as a building material in residential houses, office buildings or other buildings for humans and/or animals.

In one embodiment of the board, the flame retardant chemical composition further comprises a preservative compound. In another embodiment of the board, the preservative compound is a source of benzoate ion.

In a further embodiment of the board, the phosphate compound forms between 5% and 30% by weight of the flame retardant chemical composition.

In an embodiment of the board, the pH regulating compound forms between 0.25% and 10% by weight of the flame retardant chemical composition.

In an embodiment of the board, the preservative compound forms between 0.25% and 15% by weight of the flame retardant chemical composition.

An object of the invention is also obtained by a board formed by a plurality of strands of wood that are compressed and bonded together with an adhesive, wherein the board further comprises a flame retardant chemical composition, wherein the flame retardant chemical compound comprises in a mixture: ammonium phosphate, a source of citrate ion, a source of benzoate ion, wherein there is 1 part by weight of the source of citrate ion, 12.7 to 20 parts by weight of ammonium phosphate, and 0.8 to 2.2 parts by weight of the source of benzoate ion.

BRIEF DESCRIPTION OF THE DRAWINGS

A further understanding of the nature and advantages of the present invention may be realized by reference to the remaining portions of the specification and the drawings.

In the following, preferred embodiments of the invention are explained in more detail with reference to the drawings, wherein.

DETAILED DESCRIPTION

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete and will fully convey the scope of the invention to those sidled in the art. Like reference numerals refer to like elements throughout. Like elements will thus not be described in detail with respect to the description of each figure.

Figure 1:
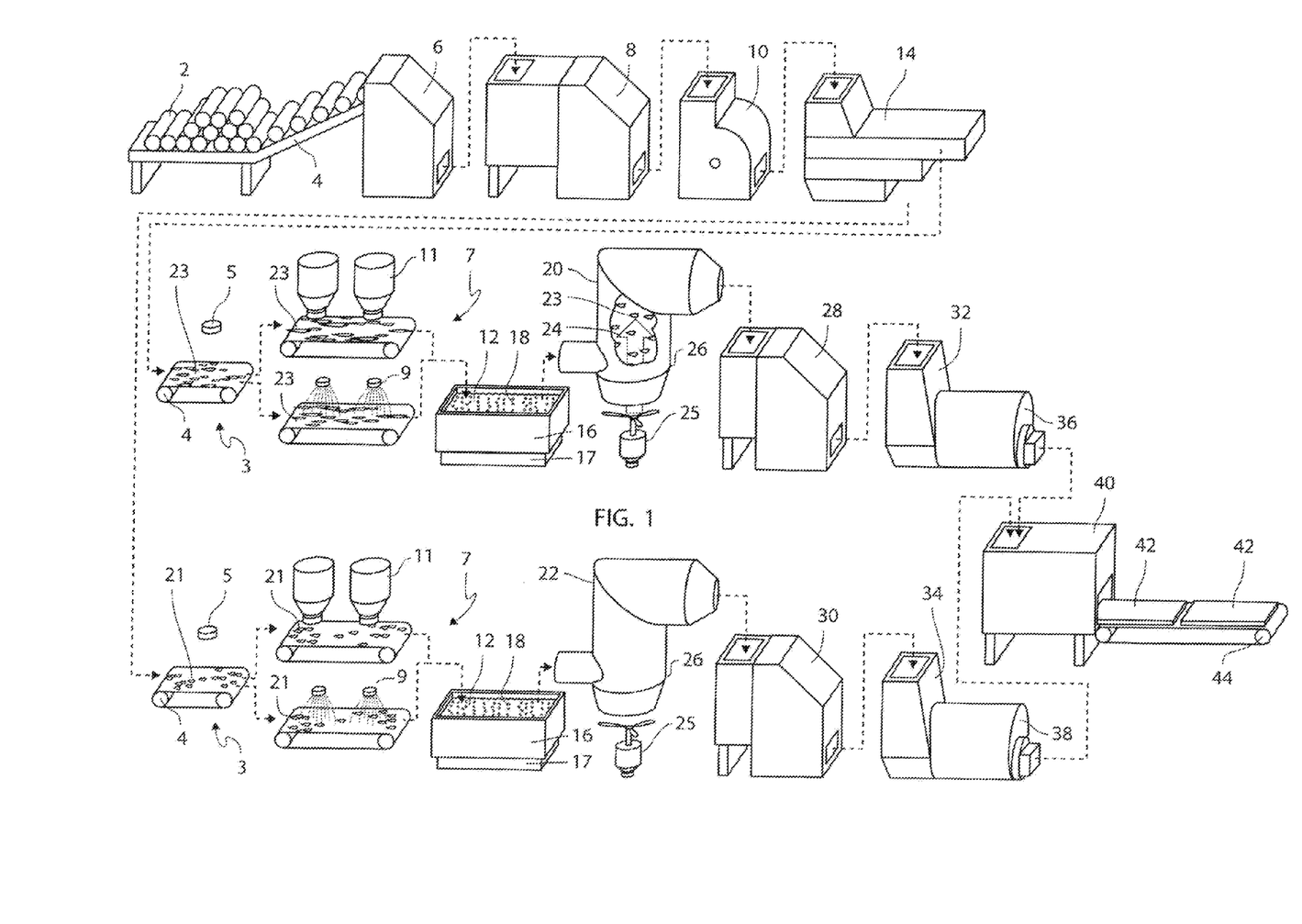
FIG. 1 shows how a preferred embodiment of how the inventive method may be exercised.

FIG. 1 schematically shows how an embodiment of the inventive method may be exercised. First, logs 2 of wood are placed on a conveyer 4, which moves the logs 2 to a knife drum flaker 6. The knife drum flaker 6 slices the logs 2 so that elongated wood flakes are produced having their fiber elements parallel to the length of the flakes. The flakes of wood particles produced by the knife drum flaker 6 may be stored in a storage bin 8 until needed or conveyed directly to a hammer mill 10, which further splits the flakes into smaller wood strands of a desired average width and length, thereby providing strands of wood.

The wood particles are separated into three (or optionally more) fractions, two of which are used to form the layers of a multilayer board. The third fraction contains oversized particles that are unsuitable for use in forming the layers and therefore are refined further to form usable particles. In the arrangement of the equipment illustrated in FIG. 1, the wood particles are first passed through a particle separator 14. The particle separator 14 is designed to classify and separate the wood particles into three fractions; fines 21, acceptable strands (referred to herein as "strands" 23), and oversized particles.

In order to ensure that the strands 23 of wood have the desired humidity between 5% and 25%, preferably between 5% and 20%, even more preferably between 8% and 20%, or even mare preferably between 12% and 17%, they are led through a measurement stage 3, wherein a plurality of moisture sensors 5 detect the humidity of the passing strands 23 of wood. The moisture sensors could in one embodiment be capacitive sensors.

If the measurement shows that the humidity of the strands 23 is lower than the desired humidity, the strands are led to a processing stage 7, wherein a plurality of sprinklers 9 or atomizers are used to increase the humidity of the strands 23. In one embodiment the quantity of water that is applied to the strands 23 through the plurality of sprinklers 9 or atomizers is dosed in dependence of the measured humidity.

On the other hand, if the measurement shows that the strands 23 have a humidity that is larger than the desired one, then the strands 23 are led to a processing stage, wherein a pre-drying takes place in a pre-dryer 11. In one embodiment, the pre-drying includes a step of using a heated air jet, and in one embodiment the pre-drying is performed in dependence of the measurement of the humidity of the strands 23.

Hereby it is achieved that the strands 23 have the optimal humidity before being immersed into the watery solution of the fire retardant chemical composition.

Then the fines 21 and strands 23 of wood are immersed in a watery solution of a flame retardant chemical composition 12, wherein the fines 21 and the strands 23 of wood are soaked. The watery solution of a flame retardant chemical composition 12 is placed in a container 16, which is stirred by releasing air hobbles 18 from the bottom of said container 16. This stirring causes the strands 23 to be separated from each other thereby exposing substantially all their surfaces to the watery solution of a fire retardant composition 12, which again leads to a very efficient and time saving impregnation. The air bubbles can be pumped into the container 18 using an air pump 17. In alternative embodiments other kind of stirring means, e.g. mechanical stirring means, could be used. When the strands of wood have been immersed in the watery solution of a fire retardant composition 12 for a sufficiently long time, such as for example less than 10 minutes, e.g. between 2 minutes and 6 minutes, such as for example 3 minutes or 4 minutes, they are removed from the watery solution of a fire retardant composition 12, for example by using a screw conveyor or other means (not illustrated).

After the fines 21 and strands 23 of wood have been removed from the watery solution of a fire retardant composition 12, they are too wet to be formed into boards. Thus they are subsequently passed through an additional drying apparatus 20 and 22 wherein they are at least in part dried, i.e. dried to a desired moisture level. In the drying apparatus 22, the strands 23 are subjected to an air jet illustrated by the arrow 24. This air-jet 24 has a direction that is substantially opposite to the force of gravity on the strands 23. Hereby the air-jet 24 will remove the moisture and water content from the strands 23, whereby the strands 23 become increasingly lighter. The pressure from the air-jet 24 is balanced in such a way against the force of gravity on the strands 23 that when the water content of the strands 23 is sufficiently low, they are moved further up in a pipe or tunnel 26 until they reach a level wherein the water content is sufficiently low for them to be moved further to the stage wherein the adhesive is applied. The air-jet 24 may be generated by a blower 25. The dryer 22 works analogously to the dryer 20 and will therefore not be described in further detail. Alternatively to using drying apparatus 20 and 22, the strands could be drip-dried. Thus in an alternative embodiment, the driers 20 and 22 could be omitted.

The fines 21 and strands 23 fractions are then stored in their respective bins 30 and 28 until needed for forming the board. A cyclone (not shown) may be used to dispel the air flow and discharge the strands into the bins 20 and 30, which also function as a buffer. In alternative embodiments, the discharge bins 28 and 30 are optional.

As wood particle fines 21 and strands 23 are needed to form the boards, they are transferred from their respective bins 30 and 28 to metering bins 34 and 32 operatively associated with blenders 38 and 36. Each metering bin 32, 34 serves to discharge wood particles into its operatively associated blender 36, 38 at a controllably constant feeding rate. Each blender 36, 38 is also arranged to receive an adhesive (and other additives, if desired) at a controlled feeding rate. The blenders 36, 38 thoroughly mix the received components to form adhesive/wood particle admixtures. The component feeding rates are controlled to produce the adhesive-to-wood particle ratios desired for the admixtures. Adhesive is dispensed to each of the blenders 36 and 38 by a conventional resin mixer (not illustrated). The resin mixer serves to mix the individual components forming the adhesive, and other additives when used, and meter the required quantity of adhesive to the blender 36 and/or 38. Any of the resins and associated components used to make adhesives for forming common wood particleboards can be used to make the adhesive for forming the wood particleboard of the present invention. While different adhesive-to-wood particle ratios may be used in the fine and strand admixtures (usually, a lower adhesive-to-wood particle ratio is preferred for admixtures of fines), mixers are available that can simultaneously dispense adhesive at different feeding fates. In any event, a variety of adhesives may be used to form the fine and strand admixtures, and the admixtures can be formed to have any of a wide range of adhesive-to-wood particle ratios. For example, urea formaldehyde, phenol formaldehyde, melamine modified urea or di-isocyanate resin based adhesives, or combinations of them, can be used to form the admixtures. Preferably, the adhesive is polymeric diphenylmethane disocyanate. The type of adhesive and the adhesive-to-wood particle ratio selected for the fine and strand admixtures is usually determined by the intended use of the end product, the properties desired for the end product, and the process selected to form the board. Phenol formaldehyde resin based adhesives can be used in the production of multilayer particleboards intended for moat end-product uses, including about 8% of such adhesive in the fine admixture and about 6% of such adhesive in the strand admixture produces satisfactory bonding. Preferably, the overall moisture content of the strand admixture is within the range of about 8% to 13%, while that of the fine admixture is within the range of about 8% to 20%, on an oven dry weight basis. If it is not convenient or possible to use a single resin mixer to furnish the adhesives for both the fine and strand admixtures, separate resin mixers can be arranged to dispense the desired adhesive separately to the separate blenders 36 and 38 that produce the fine and strand admixtures, respectively.

The blended admixtures of adhesive coated fines 21 and adhesive coated strands 23 are conveyed to feeding bins associated with the wood compression device 40 employed to form the oriented strand boards 42. The blended admixtures of adhesive coated fines 21 and adhesive coated strands 23 are conveyed to the compression device 40, wherein the fines 21 and strands 23 are mixed in a desired ratio and compressed into a predetermined shape, and cured in order to produce a board 42 of strands 23 and fines 21 having a predetermined shape. Alternatively, only strands 23 could be used in producing the board 42.

In the compression device 40, strands 23 (and possible also fines 21) are subjected to the necessary pressure and temperature conditions to effect compressing and curing of the adhesive, whereby an integral, highly compacted wood particleboard 42 body is produced.

A wide range of pressure and temperature combinations can be employed to form the particleboard. The press pressure and temperature conditions can be manipulated to either enhance certain properties or to obtain the best overall combination of properties in the produced particleboard. The particular temperature and pressure required to produce a desired set of properties in a multilayer particleboard of particular construction can be determined empirically. Temperatures up to 230 degrees Celsius and pressures in the range of 35 to 50 kilopounds per square centimeter (kp/sqcm) can be used to form a particleboard. Following completion of the press cycle, which requires 1 to 10 minutes, depending upon the thickness and desired density of the finished particleboard, they are placed on a roller conveyor 44 for delivery to storage or further processing equipment. The additional processing equipment will typically include edge and end trim saws for forming straight edges and ends in the particleboard sections and cross-cut and rip saws for cutting the sections into desired pre-cut lumber sizes. In addition, the formed particleboard sections can be cut to obtain lumber having a single surface layer. This is accomplished by cutting the formed particleboard generally along its length-width plane. For example, by sawing the formed particleboard at a slight angle to its length-width plane, beveled siding lumber with a single surface layer can be produced. Hence, it will be appreciated that a wide variety of lumber can be produced from such a particleboard.

While a particular arrangement of equipment has been described thus far for producing a particular particleboard, other arrangements of equipment will also produce that and other embodiments of a board. For example, pre-compression press apparatus and pre-heating radio frequency (RF) heating apparatus can be included in the production line. The use of pre-compression and pre-heating apparatus reduces the overall pressing time required to form the boards, especially if multilayer particleboards are produced. Also, mat weighing apparatus and mat reject apparatus can be included in the particleboard production line in order to remove from the production line improperly formed mat sections usually, detectable as an incorrect mat section weight. The removed or rejected mat sections can, for example, be conveyed by a swivel conveyor to a mat destruction device and the resulting material returned to the wet flake storage bin 8.

The method can also include machinery for aligning the strands so that they are substantially parallel to each other and/or forming at least two layers of strands, wherein the strands of each layer are substantially parallel to each other, and machinery for placing the layers on top of each other in such a way that the strands of two abutting layers are not parallel to each other, thereby producing an oriented strand board with crossing layers of strands.

Figure 2:
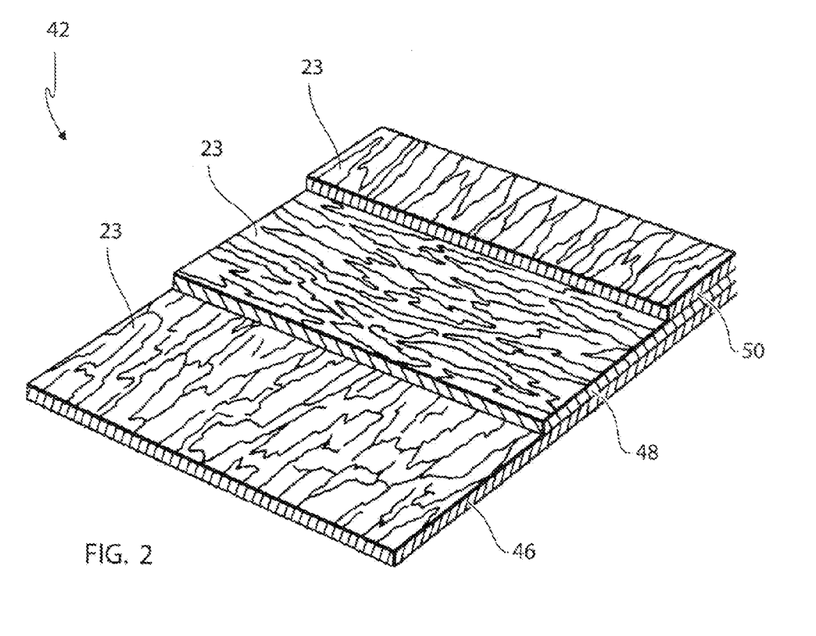
FIG. 2 shows an embodiment of a board according to the invention.

FIG. 2 shows an embodiment of an oriented strand board 42 according to the invention, which board comprises three layers 46, 48, 50 of strands 23, two identical surface layers 46 and 60, and one intermediate layer 48. Furthermore, the embodiment illustrated is a long rectangular board configuration commonly used for finish-grade lumber. However, as should be readily apparent from the entire description of the present invention, the illustrated number of layers and configuration of the multilayer wood particleboard is merely exemplary and can be varied without departing from the scope of the present invention.

The plurality of strands 23 of wood are compressed and bonded together with an adhesive (for example as described above). The board 42 further comprises a flame retardant chemical composition, said composition comprising a phosphate compound.

As illustrated in FIG. 2, each layer 46 is composed substantially of thin wood strands 23, which have a length several times greater than their width and which are produced so that their fiber elements are substantially parallel to their length. While the wood strands 23 are generally straight, they have an irregular contour. The strands 23 are distributed in each layer 48, 48, 50 relative to each other with their length in substantial parallel orientation and extending in a direction approaching a line which is parallel to one edge of the layer 48, 48, 50. The wood strands 23 have a length in the range of about 12 mm to 150 mm, a width in the range of about 2.0 mm to 20.0 mm and a thickness in the range of about 0.2 mm to 0.6 mm. The wood strand layers 46, 48, 50 can include wood particles having dimensions outside the above-specified ranges and usually include a significant amount of wood particle fines as fill for voids that would otherwise exist in the layer 46, 46, 50 because of the irregular contour of the strands 23. The layers 46, 48, 50 can include up to about 20%, on an oven dry weight basis, wood particle fines without degrading the strength, durability and stability properties of the board 42.

With respect to the parallel orientation of the strands 23, FIG. 2 shows strands 23 crossing one another in a woven fabric-like pattern while having a mean direction parallel to one edge of the layer 46, 48, 50. In accordance with the present invention, parallel orientation is used to define a distribution of wood strands 23 in which the average acute angle between crossing strands is less than about 40 degrees and the mean direction of the strands is parallel to one edge of the layer 46, 48, 50.

The three layers 46, 48, 50 are arranged in a layer-to-layer cross-oriented strand pattern. In other words, the top 48 and bottom 50 outer layers are formed to have their strands 23 parallel and the central layer 48 is formed to have its strands 23 perpendicular to those forming the outer layers 46 and 50. The multilayer board 42 can be formed of any number of two or more layers 46, 48, 50. However, superior strength, durability and stability properties are achieved by a multilayer construction of three or a greater odd number of layers of oriented wood strands arranged in a layer-to-layer cross-oriented strand pattern. In addition, improved bending and tensile strengths are obtained by orienting the strands 23 in a multilayer board composed of an odd number of layers so that the strands 23 in the outer two layers 46, 50 have their lengths extending in the direction of the length dimension of the board 42 and the strands 23 of inner layer(s) are cross-oriented to form the desired layer-to-layer cross-oriented strand pattern.

In an alternative embodiment, both the top 50 and bottom 48 layers are covered by a surface layer (not illustrated), composed substantially of wood particle fines distributed in a particular unoriented graduated size pattern. The fines are composed of irregularly contoured wood particles having width and thickness considerably less than the average width of the wood strands 23 forming the three layers 46, 48, 50. Such wood particle fines may be in the form of short elongated particles, pellet shaped particles and/or long, thin wood fiber particles. For constructing multilayer boards having core layers formed by wood strands 23 having average dimensions in the above-specified ranges, fines having a width and thickness less than an upper limit of about 0.50 mm are used to form the two surface layers (not shown). The surface layers can include up to about 30%, on an oven dry weight basis, oversized wood particles having widths and/or thicknesses greater than the above-specified upper limit without impairing the ability to form a smooth surface finish, particularly, if the oversized wood particles are confined to a region of the surface layers at or near the adjacent outer layers 46 and 50, respectively.

Figure 3:
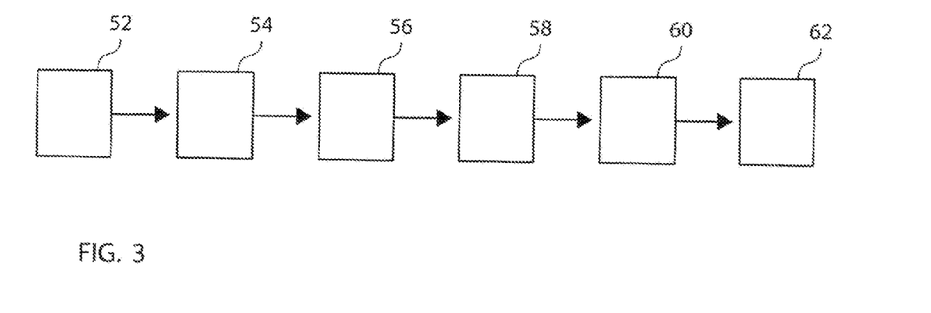
FIG. 3 shows a flow diagram of an embodiment of a method according to the invention.

FIG. 3 shows a flow diagram of an embodiment of a method according to the invention, said method comprising the following steps in the given order:
(a) Providing strands of wood, illustrated by the box 52.
(b) Immersing the strands of wood in a watery solution of a flame retardant chemical composition, illustrated by the box 54.
(c) Separating the strands of wood from each other, illustrated by the box 55.
(d) At least in part drying the strands of wood, illustrated by the box 58,
(e) Applying an adhesive to the strands of wood, illustrated by the box 50.
(f) Forming a board of a predetermined shape from the strands, illustrated by the box 62.

The flame retardant chemical composition mentioned with reference to any of the FIG. 1, 2 or 3 is preferably a flame retardant chemical composition (in a watery solution) as described in the section "summary of the invention", the description of which will therefore not be repeated here.

LIST OF REFERENCE NUMBERS

In the following is given a list of reference numbers that are used in the detailed description of the invention.
2 log
3 measurement stage for measuring humidity
4 conveyor
5 moisture sensors
6 knife drum faker
7 processing stage for moisturizing the strands
8 storage bin
9 sprinklers or atomizers
10 hammer mill
11 pre-dryer for pre-drying the strands
12 watery solution of a fire retardant composition
14 particle separator
16 container for watery solution of a fire retardant composition 12
17 air pump
18 air bobbles
20, 22 drying device
21 fines of wood
23 strands of wood
24 air-jet
25 blower
26 tunnel or pipe
28, 30 storage bins
32, 34 metering bins
36, 38 blenders
40 compression device
42 board, oriented strand board, particleboard
44 conveyor
46 bottom layer of a board
48 central or intermediate layer of a board
50 top layer of a board
50-62 method steps

The invention claimed is:

1. A method of manufacturing a fire proof board from strands of wood, the method comprising the following steps in the given order:
(a) providing strands of wood, and
measuring whether the provided strands of wood have a desired humidity between 5% and 20%, preferably between 8% and 20%,
increasing the humidity of the strands if the measurement shows that they have a humidity that is lower than the desired one, or pre-drying the strands, if the measurement shows that they have a humidity that is larger than the desired one,
(b) immersing the strands of wood in a watery solution of a flame retardant chemical composition,
(c) separating the strands of wood from each other by stirring the mixture of strands and watery solution of the flame retardant chemical composition,
(d) at least in part drying the strands of wood to a humidity of between 4% and 10%, preferably between 4% and 8%, thereby providing dry impregnated strands of wood,
(e) applying an adhesive to the strands of wood, and
(f) forming a board of a predetermined shape from the strands.

2. The method according to claim 1, wherein the step (d) of drying the strands of wood comprises the step of drying the strands for 2 minutes-10 minutes, preferably for 2 minutes-8 minutes, even more preferably for 2 minutes-6 minutes, yet even more preferably for 3 minutes-4 minutes.

3. The method according to claim 1, wherein the watery solution of the fire retardant chemical composition comprises an unsaturated solution of said chemical composition.

4. The method according to claim 1, wherein the watery solution of the fire retardant chemical composition comprises less than 25% by weight of said solution, preferably between 15% and 22%, such as 18.5% by weight of said solution.

5. The method according to claim 1, wherein the step (b) of immersing the strands of wood in a watery solution of a flame retardant chemical composition comprises the sub step of immersing the strands of wood in a watery solution of a flame retardant chemical composition for less than 10 minutes on average, preferably between 2 minutes and 6 minutes, even more preferably between 3 minutes and 4 minutes.

6. The method according to claim 1, wherein the step (f) further comprises the sub steps of
aligning the strands so that they are substantially parallel to each other,
compressing the aligned strands and adhesive with pressure into a predetermined shape, and
curing said compressed mixture of strands and adhesive to produce a board of strands having a predetermined shape.

7. The method according to claim 1, wherein the step (f) further comprises the sub steps of
mixing the dry impregnated strands with non-impregnated strands,
aligning said mixture of impregnated and non-impregnated strands so that they are substantially parallel to each other,
compressing the aligned strands and adhesive with pressure into a predetermined shape, and
curing said compressed mixture of strands and adhesive to produce a board of strands having a predetermined shape.

8. The method according to claim 1, wherein the step (f) further comprises the sub steps of
- forming at least two layers of strands, wherein the strands of each layer are substantially parallel to each other,
- placing the layers on top of each other in such a way that the strands of two abutting layers are not parallel to each other,
- compressing the layers of strands and adhesive with pressure into a predetermined shape, and
- curing said compressed mixture of strands and adhesive to produce a layered board of strands having a predetermined shape.

9. The method according to claim 1, wherein the step (f) further comprises the sub steps of
- forming at least three layers of strands, wherein the strands of each layer are substantially parallel to each other,
- placing the layers on top of each other in such a way that the strands of two abutting layers are not parallel to each other,
- forming the two outer layers, i.e. the top and bottom layer from impregnated strands, and forming the middle layer of non-impregnated strands,
- compressing the layers of strands and adhesive with pressure into a predetermined shape, and
- curing said compressed mixture of strands and adhesive to produce a layered board of strands having a predetermined shape.

10. The method according to claim 1, wherein the step (f) further comprises the sub steps of
- compressing the strands and adhesive with pressure into a predetermined shape, and
- curing said compressed mixture of strands and adhesive to produce a board of strands having a predetermined shape.

11. The method according to claim 1, wherein the step (f) further comprises the sub steps of
- mixing the impregnated strands of wood with non-impregnated strands of wood,
- compressing the mix of impregnated and non-impregnated strands and adhesive with pressure into a predetermined shape, and
- curing said compressed mixture of strands and adhesive to produce a board of strands having a predetermined shape.

12. The method according to claim 1, wherein the step (d) of drying the strands of wood comprises the step of
- subjecting the strands of wood to an air-jet, which has a direction that is substantially opposite to the force of gravity on the strands.

13. The method according to claim 1, wherein the step (d) of drying the strands of wood comprises the step of
- drip-drying the strands of wood.

14. The method according to claim 1, wherein the step (e) of applying an adhesive to the strands of wood, comprises the sub step of spraying the adhesive on the strands of wood and/or placing the strands of wood in the adhesive.

15. The method according to claim 1, wherein the flame retardant chemical composition comprises a phosphate compound.

16. The method according to claim 15, wherein the phosphate compound is any one of the following: ammonium phosphate, potassium phosphate, and sodium phosphate.

17. The method according to claim 15, wherein the phosphate compound forms between 5% and 30% by weight of the flame retardant chemical composition.

18. The method according to claim 1, wherein the flame retardant chemical composition comprises a pH regulating compound.

19. The method according to claim 18, wherein the pH regulating compound is a weak organic acid.

20. The method according to claim 18, wherein the pH regulating compound forms between 0.25% and 10% by weight of the flame retardant chemical composition.

21. The method according to claim 1, wherein the flame retardant chemical composition comprises a preservative compound.

22. The method according to claim 21, wherein the preservative compound is a source of benzoate ion.

23. The method according to claim 21, wherein the preservative compound forms between 0.25% and 15% by weight of the flame retardant chemical composition.

24. The method according to claim 1, wherein the flame retardant chemical compound comprises in a mixture: ammonium phosphate, a source of citrate ion, a source of benzoate ion, wherein there is 1 part by weight of the source of citrate ion, 12.7 to 20 parts by weight of ammonium phosphate, and 0.8 to 2.2 parts by weight of the source of benzoate ion.

* * * * *